United States Patent
D'Ercoli et al.

(10) Patent No.: US 10,204,284 B2
(45) Date of Patent: Feb. 12, 2019

(54) OBJECT RECOGNITION UTILIZING FEATURE ALIGNMENT

(71) Applicant: Datalogic IP Tech S.r.l., Lippo di Calderara di Reno (IT)

(72) Inventors: Francesco D'Ercoli, Bologna (IT); Marco Cumoli, Monte San Pietro (IT); Claudio Saporetti, Bologna (IT); Alessandro Franchi, Bologna (IT)

(73) Assignee: Datalogic IP Tech S.r.l., Lippo di Calderara di (IT)

( * ) Notice: Subject to any disclaimer, the term of this patent is extended or adjusted under 35 U.S.C. 154(b) by 0 days.

(21) Appl. No.: 15/666,824

(22) Filed: Aug. 2, 2017

(65) Prior Publication Data
US 2018/0157931 A1     Jun. 7, 2018

Related U.S. Application Data

(63) Continuation-in-part of application No. 15/370,706, filed on Dec. 6, 2016.

(51) Int. Cl.
  *G06K 9/46* (2006.01)
  *G06K 9/50* (2006.01)
  *G06K 9/62* (2006.01)
(52) U.S. Cl.
  CPC ............ *G06K 9/4671* (2013.01); *G06K 9/50* (2013.01); *G06K 9/6211* (2013.01)
(58) Field of Classification Search
  CPC ............... G06K 7/1491; G06K 7/1413; G06K 19/06028
  USPC ........................................ 235/462.12, 462.01
  See application file for complete search history.

(56) References Cited

U.S. PATENT DOCUMENTS

| | | | | |
|---|---|---|---|---|
| 5,296,691 A | * | 3/1994 | Waldron | G06K 7/10861 235/462.12 |
| 5,384,451 A | * | 1/1995 | Smith | G06K 7/10851 235/436 |
| 5,387,787 A | * | 2/1995 | Waldron | G06K 7/10861 235/462.12 |

(Continued)

FOREIGN PATENT DOCUMENTS

WO     2014165286 A1    10/2014

OTHER PUBLICATIONS

Non-Final Office Action dated Nov. 30, 2017 in U.S. Appl. No. 15/370,706, 17 pages.

(Continued)

*Primary Examiner* — Paultep Savusdiphol
(74) *Attorney, Agent, or Firm* — Shook, Hardy & Bacon, L.L.P.

(57) ABSTRACT

Systems, methods, and computer-readable storage media are provided for identifying (recognizing) an object from its shape in a sequence of images utilizing sequence alignment matrices (SAMs). For a given image, an object is segmented and from the segmented object, a set of key points is extracted. From the extracted key points, a set of local feature descriptors, strictly related to the key points and uniquely ordered in sequence, are extracted. The feature sequence obtained from the segmented object is aligned with a counterpart or reference image (e.g., a model or another image) using a Sequence Alignment Matrix (SAM). A custom scoring technique for the alignment provides a quality index for the identification of the object.

20 Claims, 12 Drawing Sheets

(56) References Cited

U.S. PATENT DOCUMENTS

| | | | | | |
|---|---|---|---|---|---|
| 5,457,308 | A | * | 10/1995 | Spitz | G06K 7/14 235/462.12 |
| 5,821,519 | A | * | 10/1998 | Lee | G06K 7/14 235/462.16 |
| 5,936,224 | A | * | 8/1999 | Shimizu | G06K 7/1491 235/454 |
| 6,267,293 | B1 | * | 7/2001 | Dwinell | G06K 7/14 235/454 |
| 8,640,952 | B2 | * | 2/2014 | Wang | G06K 7/1417 235/375 |
| 2012/0181336 | A1 | * | 7/2012 | Wang | G06K 7/1417 235/437 |
| 2012/0256001 | A1 | * | 10/2012 | Deppieri | G06K 7/14 235/462.41 |
| 2015/0193431 | A1 | | 7/2015 | Stoytchev et al. | |
| 2016/0104022 | A1 | * | 4/2016 | Negro | G06K 7/1452 235/462.16 |

OTHER PUBLICATIONS

Notice of Allowance in U.S. Appl. No. 15/370,706 dated May 23, 2018, 8 pages.

* cited by examiner

OBJECT RECOGNITION UTILIZING FEATURE ALIGNMENT

CROSS-REFERENCE TO RELATED APPLICATIONS

This application is a continuation-in-part of, and claims priority to, U.S. patent application Ser. No. 15/370,706, filed Dec. 6, 2016 and entitled "Barcode Reconstruction Utilizing a Sequence Alignment Matrix," the entirety of which is hereby incorporated by reference. Additionally, this application is related by subject matter to U.S. patent application Ser. No. 15/370,701, filed Dec. 6, 2016 and entitled "In-Field Data Acquisition and Formatting," and U.S. patent application Ser. No. 15/370,709, filed Dec. 6, 2016 and entitled "Predictive Anomaly Detection," each of which is hereby incorporated by reference as if set forth in its entirety herein.

BACKGROUND

Traditional means for automatic recognition and/or identification of items largely has been limited to barcodes and special symbols. In recent years, such traditional means have been evolving (for instance, in modern two-dimensional and three-dimensional computer vision systems) to include capabilities for improving the recognition, identification, and tracking of whole objects and their parts. Many approaches to object recognition have been proposed and implemented in the past several years in the field of computer vision, varying from basic data filtering (e.g., edge detection) to complex feature-based methods (e.g., Scale-Invariant Feature Transform (SIFT) or Speeded Up Robust Features (SURF)) and multiple transform-domain approaches. The underlying impetus for these approaches is that, different from humans, it is a challenging task for a computer vision system to recognize different objects in images or video sequences, particularly when such objects are translated, rotated, scaled in size, and/or partially obstructed from view. Furthermore, it is generally quite difficult for computer vision systems to provide a reliable and robust degree of confidence for recognition of shapes and objects in images and/or video sequences.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In various embodiments, systems, methods, and computer-readable storage media are provided for identifying (or recognizing) objects in images utilizing sequence alignment matrices. An image (for instance, a two-dimensional or three-dimensional image or video frame) is received, the image including at least one object for which identification is desired. The image is prepared (via image segmentation, segment key point extraction, and feature descriptor extraction) to create a feature sequence for the object to be identified. A sequence alignment matrix (SAM) is built such that each row of the SAM represents a feature descriptor included in the object feature sequence and each column of the SAM represents a feature descriptor included in a reference feature sequence. A score is assigned to each matrix square (i.e., matrix entry), the score being indicative of whether there is a match between a feature descriptor of the object feature sequence and a feature descriptor of the reference feature sequence (a match being indicated by comparison to a configurable similarity threshold), as well as whether previous matrix squares of the alignment (e.g., diagonal) had matching feature descriptors. An alignment score is calculated for each of the plurality of diagonals by summing the scores for each matrix square respectively comprising each of the plurality of diagonals.

In some instances, features may be missing and/or there may not be a match between a feature descriptor of the object feature sequence and a feature descriptor of the reference feature sequence. In such instances, a potential alignment may be identified that includes a portion of the matrix squares from more than one of the plurality of diagonals. In such an instance, a potential alignment score may be calculated by summing the scores for each matrix square respectively comprising the identified potential alignment. In accordance with aspects hereof, the diagonal score or potential alignment score having the highest numerical value may be selected as the proper alignment. The maximum alignment score (identification confidence degree) is compared to a threshold value, wherein if the identification confidence degree is greater than or equal to the threshold value, the object is identified as an object represented by the reference feature sequence.

BRIEF DESCRIPTION OF THE DRAWINGS

The present invention is illustrated by way of example and not limitation in the accompanying figures in which like reference numerals indicate similar elements and in which.

DETAILED DESCRIPTION

The subject matter of aspects of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As previously set forth, in recent years, traditional means for automatic recognition and/or identification of items in images have been evolving. Many approaches to object recognition have been proposed and implemented, varying from basic data filtering (e.g., edge detection) to complex feature-based methods (e.g., SIFT or SURF) and multiple transform-domain approaches. The underlying impetus for these approaches is that, different from humans, it is a challenging task for a computer vision system to recognize different objects in images or video sequences, particularly when such objects are translated, rotated, scaled in size, and/or partially obstructed from view. Furthermore, it is generally quite difficult for computer vision systems to provide a reliable and robust degree of confidence for recognition of shapes and objects in images and/or video sequences. Aspects of the present invention provide an alternative methodology for identifying or recognizing objects in images utilizing a bioinformatics-derived technique that improves the accuracy with which objects in images may be identified.

Various aspects of the technology described herein generally are directed to systems, methods, and computer-readable storage media for identifying (or recognizing) an object from its shape in a sequence of images utilizing sequence alignment matrices (SAMs). For a given image, an object is segmented and from the segmented object, a set of key points is derived or extracted. From the extracted key points, a set of local feature descriptors, strictly related to the key points and uniquely ordered in sequence, are derived/extracted. The feature sequence obtained from the segmented object is aligned and scored, using a technique derived from bioinformatics sequence alignment, to a counterpart or reference image (e.g., a model or another image). A custom scoring technique for the alignment provides a quality index (with a pass/fail threshold in some embodiments) for the identification of the object.

Figure 1:
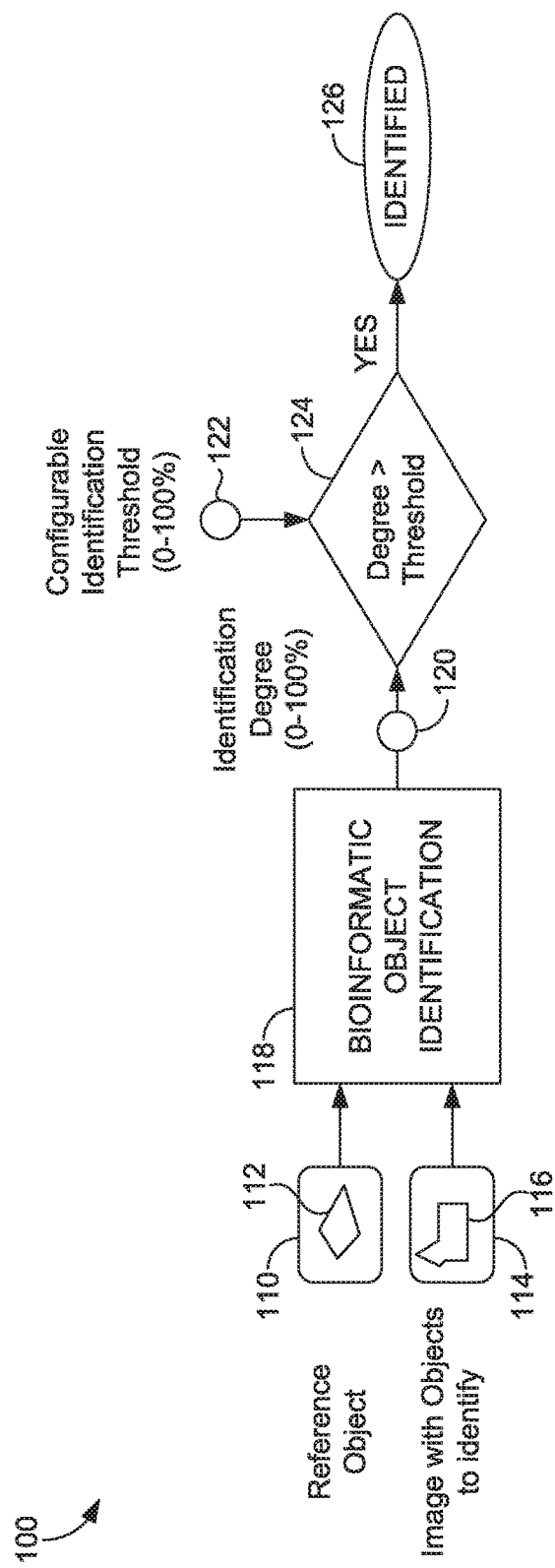
FIG. 1 is a schematic diagram illustrating a high level overview of a system for identifying objects in images utilizing a bioinformatics-derived feature alignment technique, in accordance with exemplary embodiments of the present invention.

FIG. 1 illustrates a high level overview of a system 100 for identifying objects in images utilizing a bioinformatics-derived feature alignment technique, in accordance with exemplary embodiments of the present invention. An image 114 (for instance, a two-dimensional or three-dimensional image or video frame) is received, the image 114 including at least one object 116 for which identification is desired. The image 114 is prepared (via image segmentation, segment key point extraction, and feature descriptor extraction) to create a feature sequence for the object to be identified. A sequence alignment matrix (SAM) is built such that each row of the SAM represents a feature descriptor included in the object feature sequence and each column of the SAM represents a feature descriptor included in a reference feature sequence (derived from an object 112 in a reference image 110 generally obtained from a reference pattern database or from another frame of the same data stream as the image 114). A score is assigned to each matrix square (i.e., matrix entry), the score being indicative of whether there is a match between a feature descriptor of the object feature sequence and a feature descriptor of the reference feature sequence (a match being indicated by comparison to a configurable similarity threshold), as well as whether previous matrix squares of the diagonal had matching feature descriptors. An alignment score is calculated for each of the plurality of diagonals by summing the scores for each matrix square respectively comprising each of the plurality of diagonals. In instances where features are missing and/or there is not a match between a feature descriptor of the object feature sequence and a feature descriptor of the reference feature sequence, a potential alignment may be identified that includes a portion of the matrix squares from more than one of the plurality of diagonals. In such an instance, a potential alignment score may be calculated by summing the scores for each matrix square respectively comprising the identified potential alignment. This general process is illustrated as bioinformatics object identification 118 in FIG. 1.

A maximum alignment score is determined (that is, the alignment score of the plurality of diagonals or potential alignment that is the highest) and based upon the maximum alignment score, an identification confidence degree is determined, as indicated at 120 (and as more fully described below). Generally, the identification confidence degree is represented as a percentage between 0% and 100%. The determined identification confidence degree is compared to a user-configurable identification threshold value, as indicated at 122. If the identification confidence degree is equal to or exceeds the threshold value (or, in some embodiments, if the identification confidence degree exceeds the threshold value), as indicated at 124, the object 114 is identified as the object 112 in the reference image 110. This is indicated at 126.

One of the benefits of the techniques described herein lies in the simplicity thereof while still providing a robust qualitative measure (generally expressed as a percentage) for the degree of confidence with which an object is recognized or identified. "Robustness," as intended herein, is a description of the capability of recognition not only when objects are configured in a received image as they are in a reference image, but also when objects in images or video sequences are translated, rotated, scaled in size and/or partially obstructed from view. Gaps and partial obstructions can be well managed utilizing the described bioinformatics-derived techniques because such techniques are designed to operate even in the presence of defects in the data. Techniques in accordance with embodiments of the present invention are equally suitable for both two-dimensional and three-dimensional images, and also may be applied to classical tasks such as image stitching and symbol inspection.

Accordingly, exemplary embodiments are directed to methods performed by one or more computing devices including at least one processor, the methods for identifying objects in images utilizing sequence alignment matrices and comprising: (a) receiving an image, the image including at least one object to be identified; (b) preparing the image for alignment by creating an object feature sequence for the at least one object to be identified, the object feature sequence including of a plurality of feature descriptors; (c) aligning the plurality of feature descriptors included in the object feature sequence on a sequence alignment matrix, the sequence alignment matrix being comprised of a plurality of matrix squares, such that: one of each row and each column of matrix squares represents a feature descriptor of the plurality of feature descriptors included in the object feature sequence, and the other of each row and each column of matrix squares represents a feature descriptor of a plurality of feature descriptors included in a reference feature sequence; (d) assigning a matrix square score to each matrix square, each matrix square score indicating whether or not there is feature descriptor alignment between the object feature sequence and the reference feature sequence at that matrix square; and (e) calculating an alignment score for each of the plurality of diagonals by summing the scores for each matrix square respectively comprising each of the plurality of diagonals.

Other exemplary embodiments are directed to one or more computer-readable storage media storing computer-useable instructions that, when used by one or more computing devices, cause the one or more computing devices to perform a method for reconstructing identifying objects in images utilizing sequence alignment matrices. The methods comprise: (a) receiving an image, the image including at least one object to be identified; (b) segmenting the at least one object to be identified from the received image; (c) from each segmented object, extracting a plurality of object key points; (d) from the plurality of object key points, extracting a plurality of feature descriptors ordered in sequence to create an object feature sequence for the at least one object to be identified; (e) aligning the plurality of feature descriptors included in the object feature sequence on a sequence alignment matrix, the sequence alignment matrix comprised of a plurality of matrix squares, such that: one of each row and each column of matrix squares represents one of the plurality of feature descriptors included in the object feature sequence and the other of each row and each column of matrix squares represents one of a plurality of feature descriptors included in a reference feature sequence; (f) assigning a matrix square score to each matrix square, each matrix square score indicating whether or not there is feature descriptor alignment between the object feature sequence and the reference feature sequence at that matrix square; and (g) calculating an alignment score for each of the plurality of diagonals by summing the scores for each matrix square respectively comprising each of the plurality of diagonals.

1. Still other exemplary embodiments are directed to method for identifying objects in images utilizing sequence alignment matrices, the methods comprising: (a) receiving an image that includes an object to be identified; (b) segmenting the object to be identified from the received image; (c) extracting a plurality of object key points from the segmented object; (d) extracting a plurality of feature descriptors from the plurality of object key points, the plurality of feature descriptors being ordered in sequence to create an object feature sequence for the object; (e) aligning the plurality of feature descriptors included in the object feature sequence on a sequence alignment matrix, the sequence alignment matrix comprised of a plurality of matrix squares, such that: one of each row and each column of matrix squares represents one of the plurality of feature descriptors included in the object feature sequence and the other of each row and each column of matrix squares represents one of a plurality of feature descriptors included in a reference feature sequence; (f) assigning a matrix square score to each matrix square, each matrix square score indicating whether or not there is feature descriptor alignment between the plurality of feature descriptors included in the object feature sequence and the plurality of feature descriptors included in the reference feature sequence at that matrix square; (g) calculating an alignment score for each of the plurality of diagonals by summing the scores for each matrix square respectively comprising each of the plurality of diagonals; (h) calculating an additional alignment score for a potential alignment that includes a portion of the matrix squares from more than one of the plurality of diagonals, (i) determining a maximum alignment score for the plurality of diagonals; (j) determining an identification confidence degree utilizing the maximum alignment score; and (k) comparing the identification confidence degree to a threshold value, wherein if the identification confidence degree is greater than or equal to the threshold value, the object is identified as an object represented by the reference feature sequence.

Figure 2:
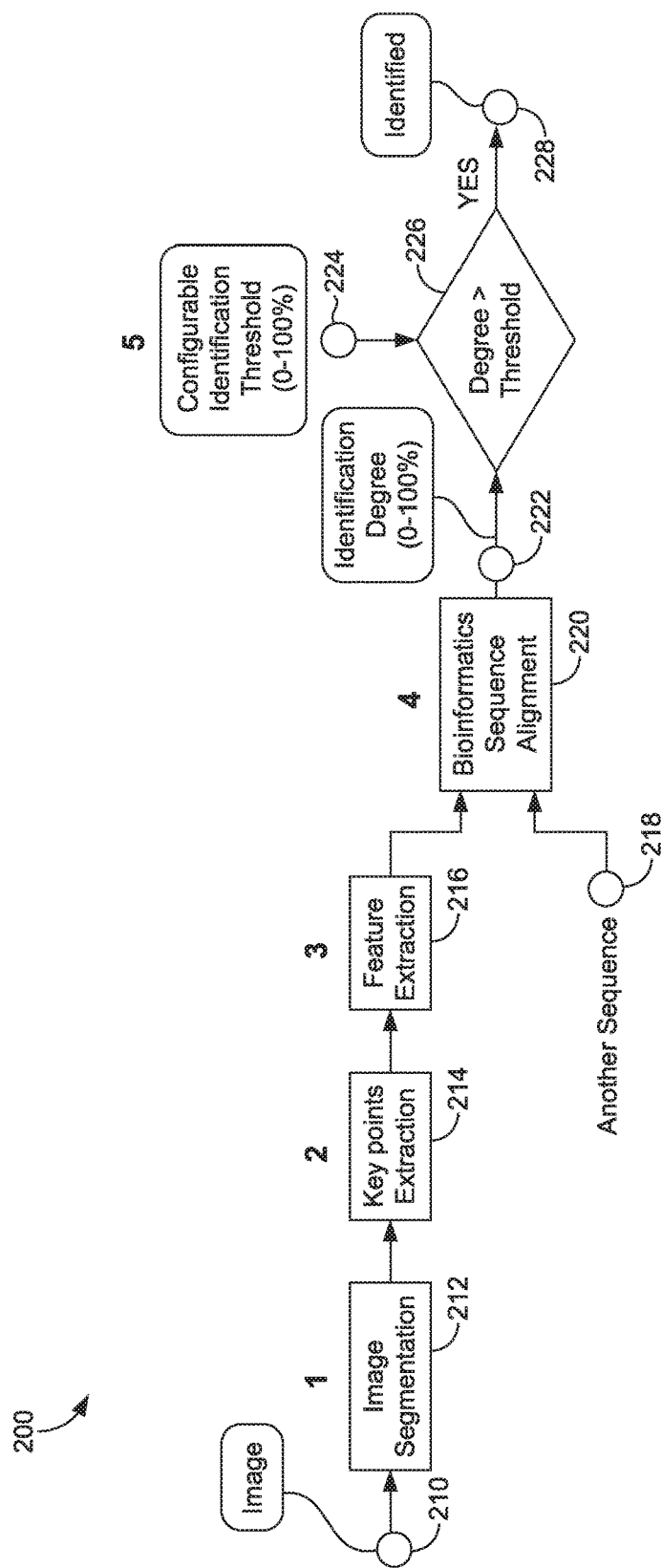
FIG. 2 is a schematic diagram illustrating an exemplary method for identifying objects in images utilizing Sequence Alignment Matrices (SAMs), in accordance with exemplary embodiments of the present invention.

With reference now to FIG. 2, illustrated is a schematic diagram showing an exemplary method 200 for identifying objects in images utilizing SAMs, in accordance with exemplary embodiments of the present invention. The diagram may be explained with reference to two images, IMAGE 1 and IMAGE 2. It will be understood by those having ordinary skill in the relevant art that this exemplification is intended only to aid in better understanding embodiments of the present invention and is not intended to limit embodiments hereof.

As indicated at 210, an image is received. Such image may be, by way of example only, a two-dimensional image, a three-dimensional image, a frame of a data stream, or the like. The received image contains at least one object for which identification or recognition is desired. Also received is a reference image (not shown in FIG. 2), to which objects in the received image may be compared for identification. As indicated at 212, at least one object is localized in the image and segmented therefrom for processing. Image segmentation and object localization techniques generally consist of partitioning a digital image into groups of pixels or regions with similar characteristics (e.g., color, intensity, texture, etc.) in order to simplify the detection and classification of objects in the image.

Through segmentation, different objects in the image are delimited by contours or segments having boundaries such as lines and curves. Curves are closely related to edges but are more helpful in object segmentation as edges are often disconnected while object segmentation is more effective with closed region boundaries. Generally, there is no overlap between different segmented regions and the union of all segmented regions generates the entire image. Various techniques for segmentation of images are known to those having ordinary skill in the art and, accordingly, such techniques are not further described herein.

Figure 3:
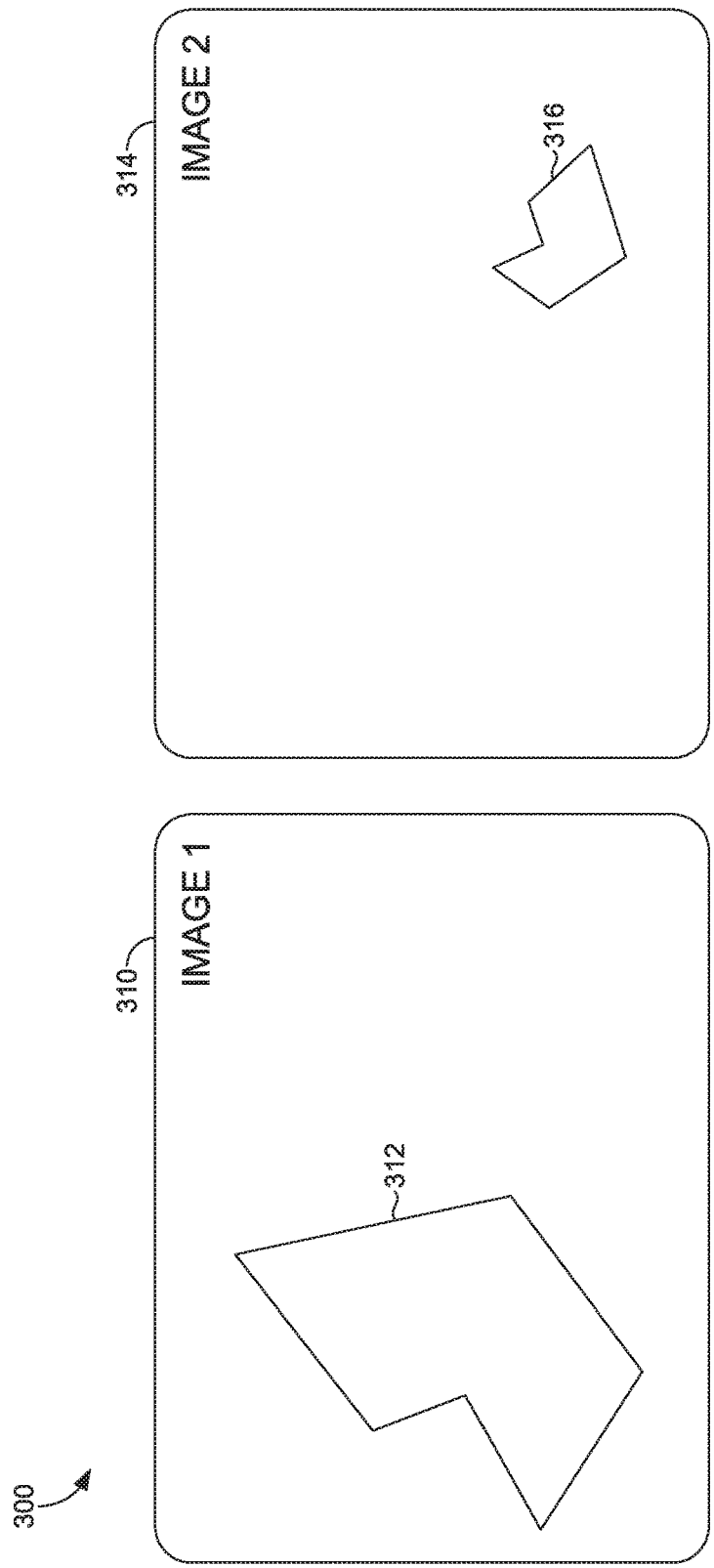
FIG. 3 is a schematic diagram illustrating segmentation of objects from two images, in accordance with exemplary embodiments of the present invention.

With reference to FIG. 3, a schematic diagram 300 is illustrated showing segmentation of an object 312 from IMAGE 1 (the received image) 310 and an object 316 from IMAGE 2 (the reference image) 314, in accordance with exemplary embodiments of the present invention.

Figure 4:
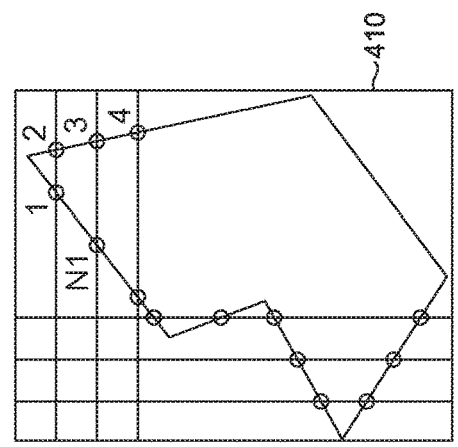
FIG. 4 is a schematic diagram illustrating extraction of key points from the objects segmented from the images of FIG. 3, in accordance with exemplary embodiments of the present invention.

Referring back to FIG. 2, as indicated at 214, from each object segmented from the received image, a plurality of object key points is extracted. Key point extraction for a segmented object in each of IMAGE 1 and IMAGE 2 is illustrated in the schematic diagram 400 of FIG. 4. As can be seen, the segmented objects are defined by a rectangular box (410 for IMAGE 1 and 412 for IMAGE 2) that is a minimum bounding rectangle for the object. In the rectangular box, a plurality of scans are taken horizontally and a plurality of scans are taken vertically, scaling the distance between two horizontal or vertical scans so that every bounding rectangular box, regardless of its dimensions, is subjected to substantially the same number of horizontal and vertical scans. Key points are those that are defined by an intersection of a horizontal or a vertical scan and the segmented perimeter of the object. Exemplary key points are illustrated as numerals 1-4 for each of IMAGE 1 and IMAGE 2 in FIG. 4.

Scaled object bounding means that the same object, whether seen closer up or farther away, will always include approximately the same number of key points. In order to accomplish such scaled object bounding, a "scan density" over two rectangular boxes, each bounding the same object seen from two different distances, is computed. That is, the distance in pixels between any two vertical or horizontal scans is determined such that a given (and configurable) number of key points in each box is guaranteed. In this way, not only the number of key points related to the object n the IMAGE 1 N1 will be closely similar to those in IMAGE 2 N2, but also a rotation-independency may be achieved, given a sufficiently high value for the scanning density. Thus, there will be no need to apply any sort of object rotation detection algorithm.

Figure 5:
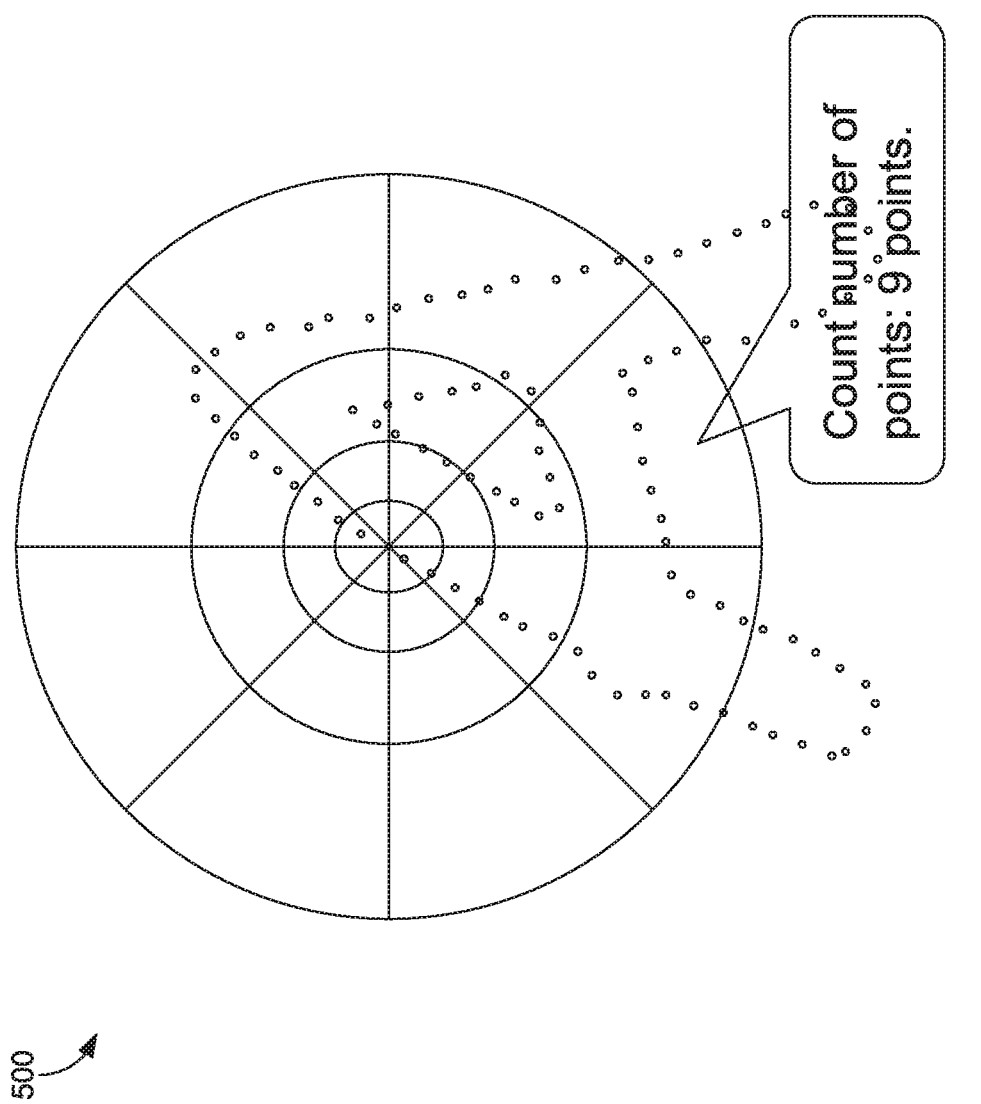
FIG. 5 is a schematic diagram illustrating the concept of feature descriptor extraction utilizing a shape context technique, in accordance with exemplary embodiments of the present invention.

With reference back to FIG. 2, as indicated at 216, from the plurality of object key points, a plurality of feature descriptors is extracted. The feature descriptors are ordered in sequence to create an object feature sequence for the at least one object. Considering a segmented object with known coordinates ($x_i$, $y_i$), techniques for extracting feature descriptors are known to those having ordinary skill in the art. One particular suitable technique is Shape Context. Various alternative feature descriptors may be utilized in accordance with embodiments hereof including, without limitation, BOLD descriptors (i.e., a pair of angles between close segments) as described in U.S. Pat. No. 9,495,607, SIFT descriptors (i.e., Difference of Gaussians or "DOG"), or binary descriptors. Any and all such variations, and any combination thereof, are contemplated to be within the scope of embodiments hereof. A Shape Context is a log-polar histogram of the relative coordinates of neighborhood key points. In each bin are counted the number of neighbor key points that falls within the bin. With reference to FIG. 5, illustrated is a schematic diagram 500 illustrating the concept of feature descriptor extraction utilizing a Shape Context technique, in accordance with exemplary embodiments of the present invention. As can be seen, in the delineated bin, nine key points are illustrated. Quantization makes the descriptor robust to imprecise key point locations.

Figure 6:
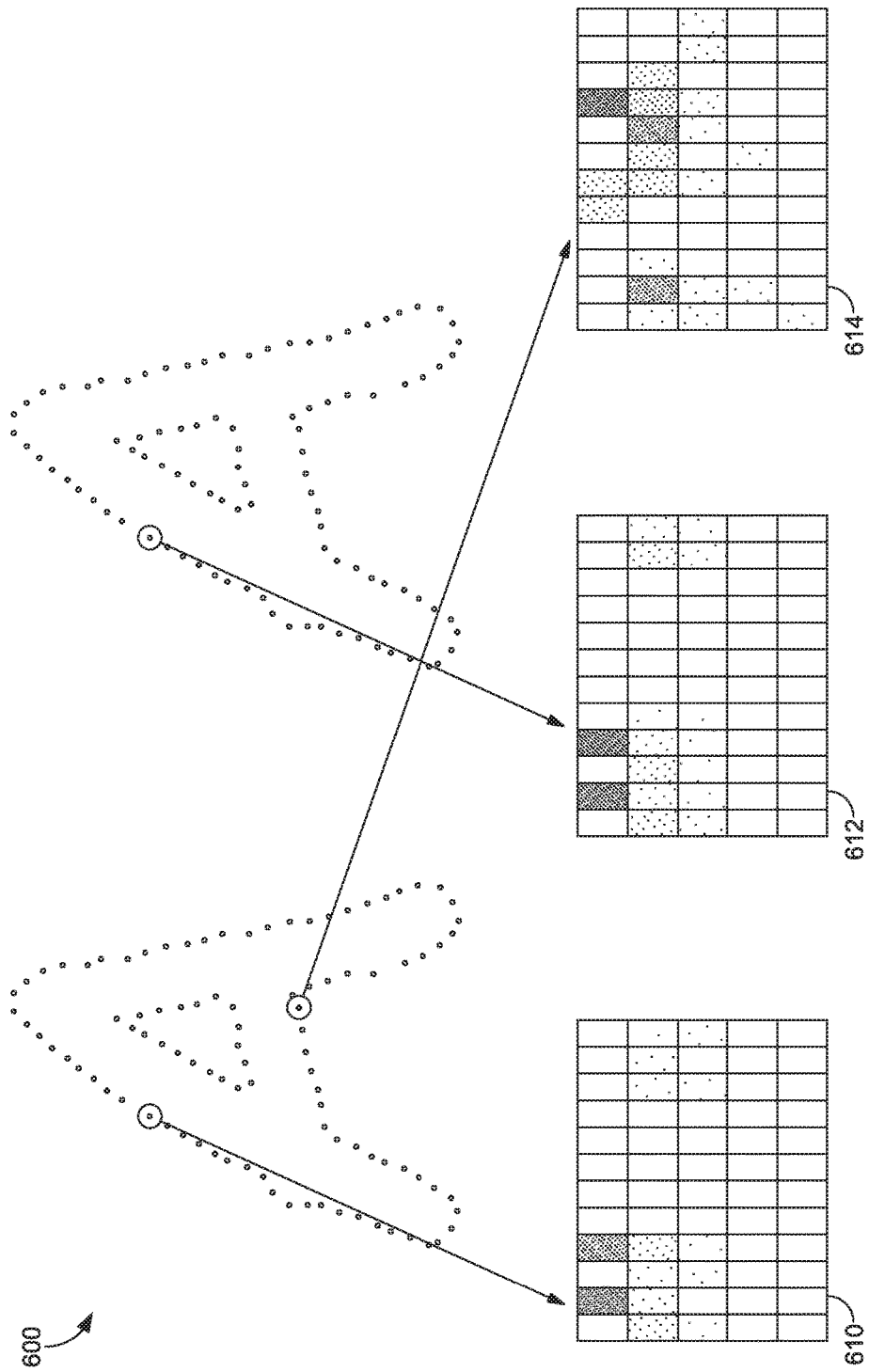
FIG. 6 is a schematic diagram illustrating an example of feature descriptor extraction utilizing a shape context technique, in accordance with exemplary embodiments of the present invention.

The schematic diagram 600 of FIG. 6 illustrates that feature descriptors of key points in similar locations for two instances of the same object will be similar. Note that the key feature descriptors shown at 610 and 612 are similar as they are derived from the same portion of the segmented object while the feature descriptors shown at 614 are different. It should be noted that feature descriptors extracted in this way are fairly independent with respect translations, rotations, sizing (scale) and occlusions of the object within the image.

When orientation invariance is needed, it may be obtained by computing the gradient orientation or, if a more robust dominant orientation is needed, using the intensity Centroid orientation (known to those having ordinary skill in the art) which defines a key point dominant orientation as the vector connecting a key point to the center of mass of a region around a key point. Scale invariance may be obtained by normalizing all radial distances by the mean or median distance between all the key point pairs along the object shape contour.

Once a key point with orientation and scale is obtained, feature descriptors may be created. Various feature descriptors may be utilized including, without limitation, BOLD descriptors (i.e., a pair of angles between close segments), SIFT descriptors (i.e., Difference of Gaussians or "DOG"), or binary descriptors (BRIEF, ORB, BinBoost, and the like). Faster alignment may be achieved utilizing SAMS in accordance with embodiments of the present invention because the distance can be computed as Humming distance which is implemented in modern compilers using, for instance, the very fast popcount method.

In short, to achieve the feature descriptor extraction indicated at 216 of FIG. 2, a Shape Context feature descriptor may be computed for each key point, an orientation and scale variation may be obtained, features may be created, and feature descriptors may be derived therefrom. The feature sequence (that is the sequence of feature descriptors) may need to be normalized in order to achieve scale independency for the object to be identified.

To identify the best alignment between two feature sequences (the object feature sequence created via steps 210, 212, 214 and 216 and a reference feature sequence 218 obtained from a reference image/object), a SAM is built having a score for every compatible alignment between data in subsequent distance feature sequences, feature descriptors included in the object feature sequence included in a row or column of matrix squares and feature descriptors included in the reference feature sequence included in the other of the row or column of matrix squares. Some alignments can be found on the diagonals of the SAM based upon the assigned alignment score. Other alignments can be found that include a portion of the matrix squares from more than one of the plurality of diagonals. In such an instance, a potential alignment score may be calculated by summing the scores for each matrix square respectively comprising the identified potential alignment. The number of feature descriptors need not be identical between the two sequences. The criterion to conclude that two feature descriptors (a row entry and a column entry) are sufficiently similar and therefore may be said to be "matching" may be based on not exceeding a configurable similarity percentage threshold (e.g., 5%) (224 of FIG. 2). That is:

$$\text{MATCH}(i,j) \leftarrow\rightarrow \text{abs}(\text{NORM\_}F1_i - \text{NORM\_}F2_j) < 5\%$$

Once the SAM with scores is built, the "best alignment" may be identified as the diagonal (alignment) having the highest score or the potential alignment having an alignment score calculated utilizing a portion of the matrix squares from more than one of the diagonals. The custom scoring system makes available a robust confidence degree for the identification. For every diagonal, a progressive integer is assigned to every matching entry beginning with numeral 1. If the entry does not match, the matrix entry is assigned the numeral 0 and the next matching entry restarts from 1. To find the best match, for every diagonal, the scores in the matrix entries are summed and the "best alignment" is the alignment having the highest score.

In some instances, features may be missing and/or there may not be a match between a feature descriptor of the object feature sequence and a feature descriptor of the reference feature sequence. In such instances, a potential alignment may be identified that includes a portion of the matrix squares from more than one of the plurality of diagonals. In such an instance, a potential alignment score may be calculated by summing the scores for each matrix square respectively comprising the identified potential alignment. In accordance with aspects hereof, the diagonal score or potential alignment score having the highest numerical value may be selected as the proper alignment.

Figure 7:
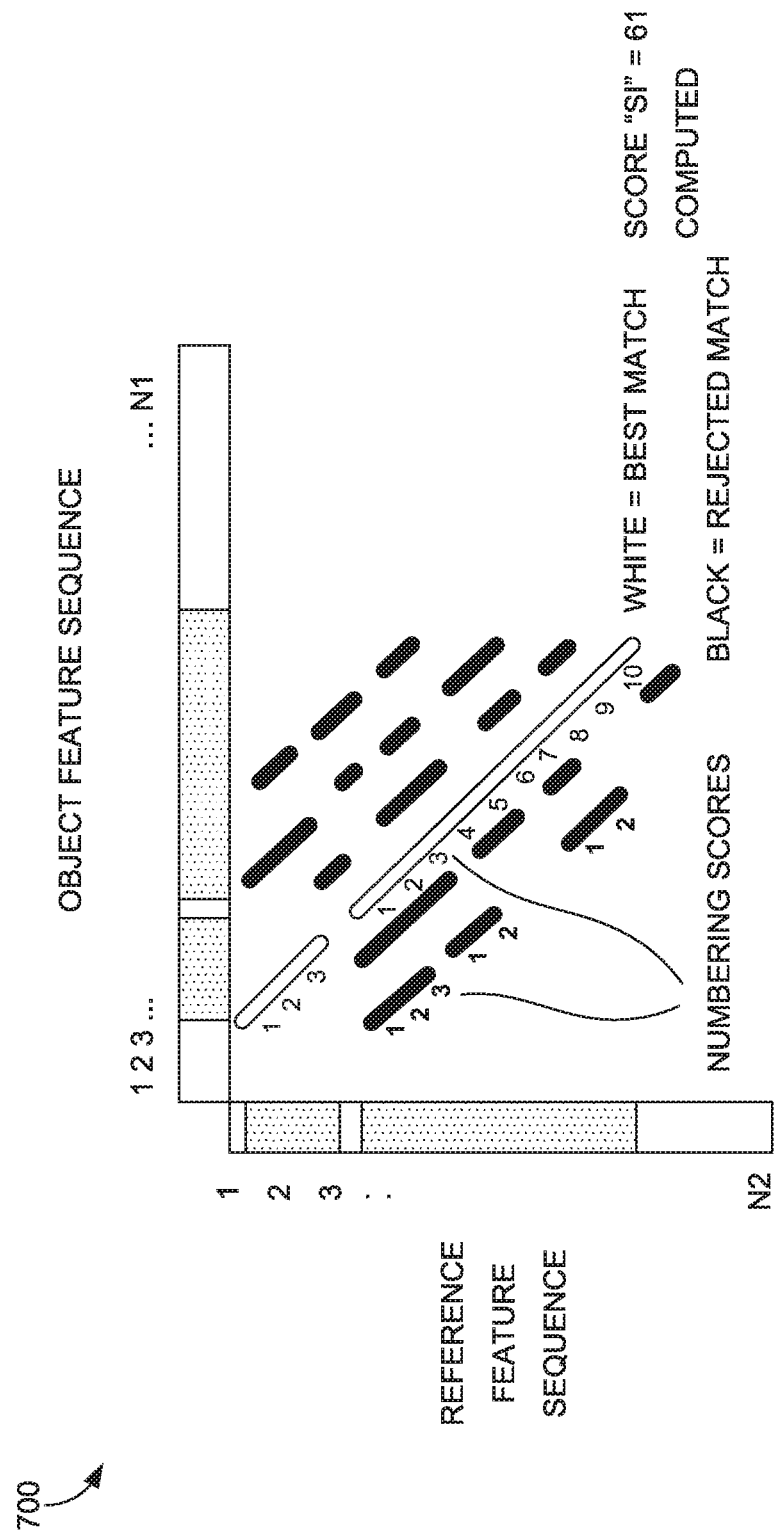
FIG. 7 is a schematic diagram illustrating diagonal scoring for an exemplary alignment of an object feature sequence with a reference feature sequence utilizing a SAM, in accordance with embodiments of the present invention.

With reference to FIG. 7, a schematic diagram 700 is shown illustrating diagonal scoring for an exemplary alignment of an object feature sequence with a reference feature sequence utilizing a SAM, in accordance with embodiments of the present invention. The white score represents the best match with a score of 61. It should be noted that long matching feature sequences (without interruption) are more rewarded than the shorter ones. Moreover, as even partial alignments are identified, techniques in accordance with embodiments hereof are robust against partial occlusions.

As a natural consequence of the score calculation discussed herein above, the maximum expected score in the case of N-length i-th sequence is defined by the Gauss' formula:

$$MAX(Score(N1))=1+2+ \ldots +N1=N1(N1+1)/2.$$

$$MIN(Score(N1))=0$$

To derive a simple and intuitive (percentage-based) identification confidence degree from the maximum diagonal score (as shown at 222 of FIG. 2), it suffices to compute the following (if Score>0, else 0):

$$ID\_DEGREE(N1)=Score/(N1(N1+1)/2)[0,1]$$

As indicated at 226 of FIG. 2, if the identification confidence degree exceeds a configurable threshold value 224, the object in the image is identified 228 as the object in the reference image.

Figure 8:
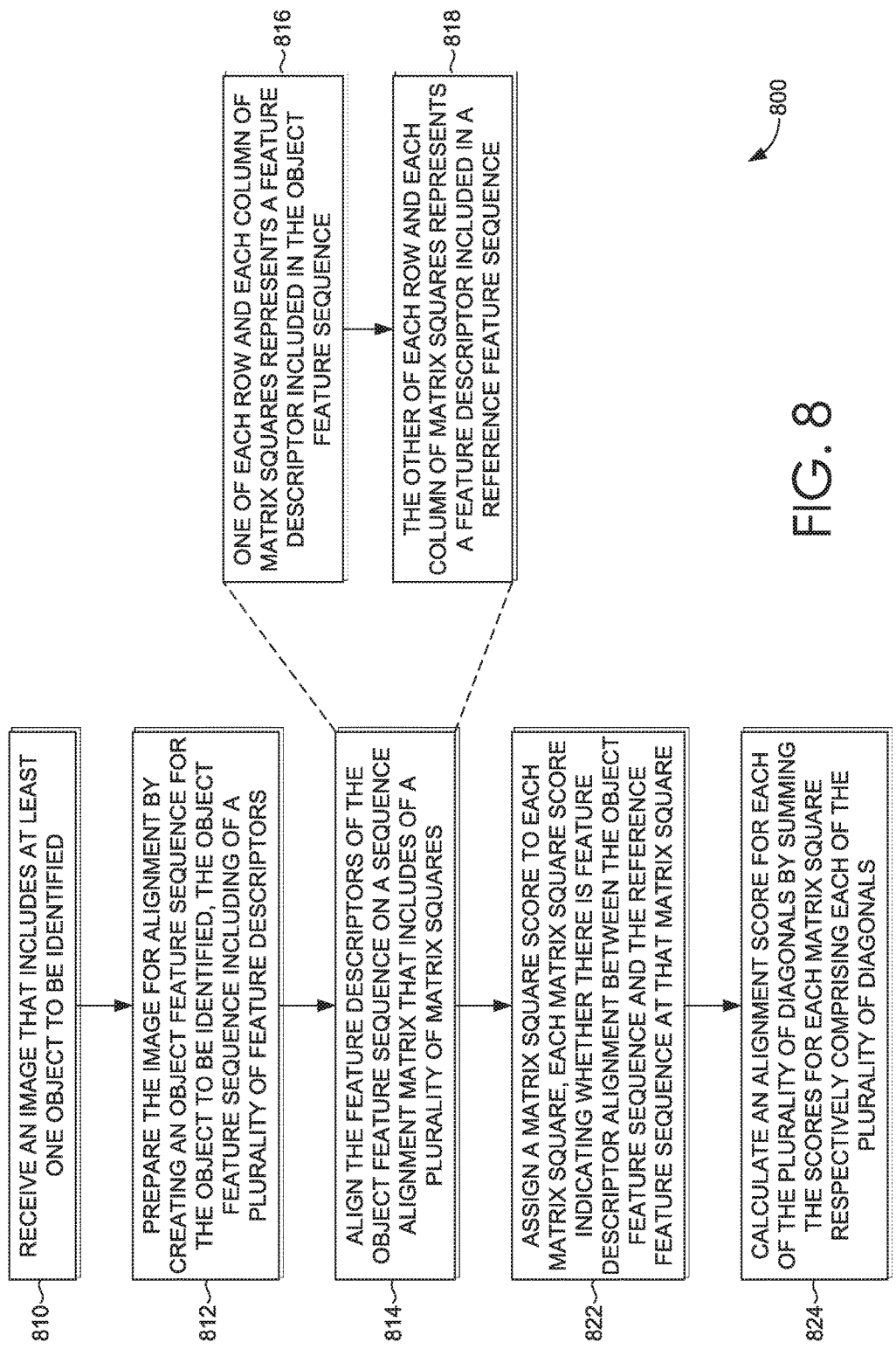
FIG. 8 is a flow diagram illustrating an exemplary method for identifying objects in images utilizing SAMs, in accordance with embodiments of the present invention.

With reference now to FIG. 8, illustrated is a flow diagram showing an exemplary method 800 for identifying objects in images (for instance, in connection with computer vision systems) utilizing sequence alignment matrices, in accordance with exemplary embodiments of the present invention. As indicated at block 810, an image is received (e.g., a two-dimensional or three-dimensional image). The received image includes at least one object for which identification is desired. As indicated at block 812, the received image is prepared for alignment (i.e., utilizing a sequence alignment matrix) by creating an object feature sequence for the at least one object for which identification is desired. The object feature sequence includes of a plurality of feature descriptors uniquely ordered in sequence.

As indicated at block 814, the plurality of feature descriptors included in the object feature sequence is aligned on a sequence alignment matrix. The sequence alignment matrix is comprised of a plurality of matrix squares. As indicated at block 816, each row or each column of matrix squares represents a feature descriptor of the plurality of feature descriptors included in the object feature sequence. As indicated at block 818, the other of each row or each column of matrix squares represents a feature descriptor of a plurality of feature descriptors included in a reference feature sequence.

As indicated at block 822, a matrix square score is assigned to each matrix square that includes a feature descriptor of the object feature sequence. Each matrix square score indicates whether or not there is feature descriptor alignment between the object feature sequence and the reference feature sequence at that matrix square. As indicated at block 824, an alignment score is calculated for each of the plurality of diagonals by summing the scores for each matrix square respectively comprising each of the plurality of diagonals.

Figure 9:
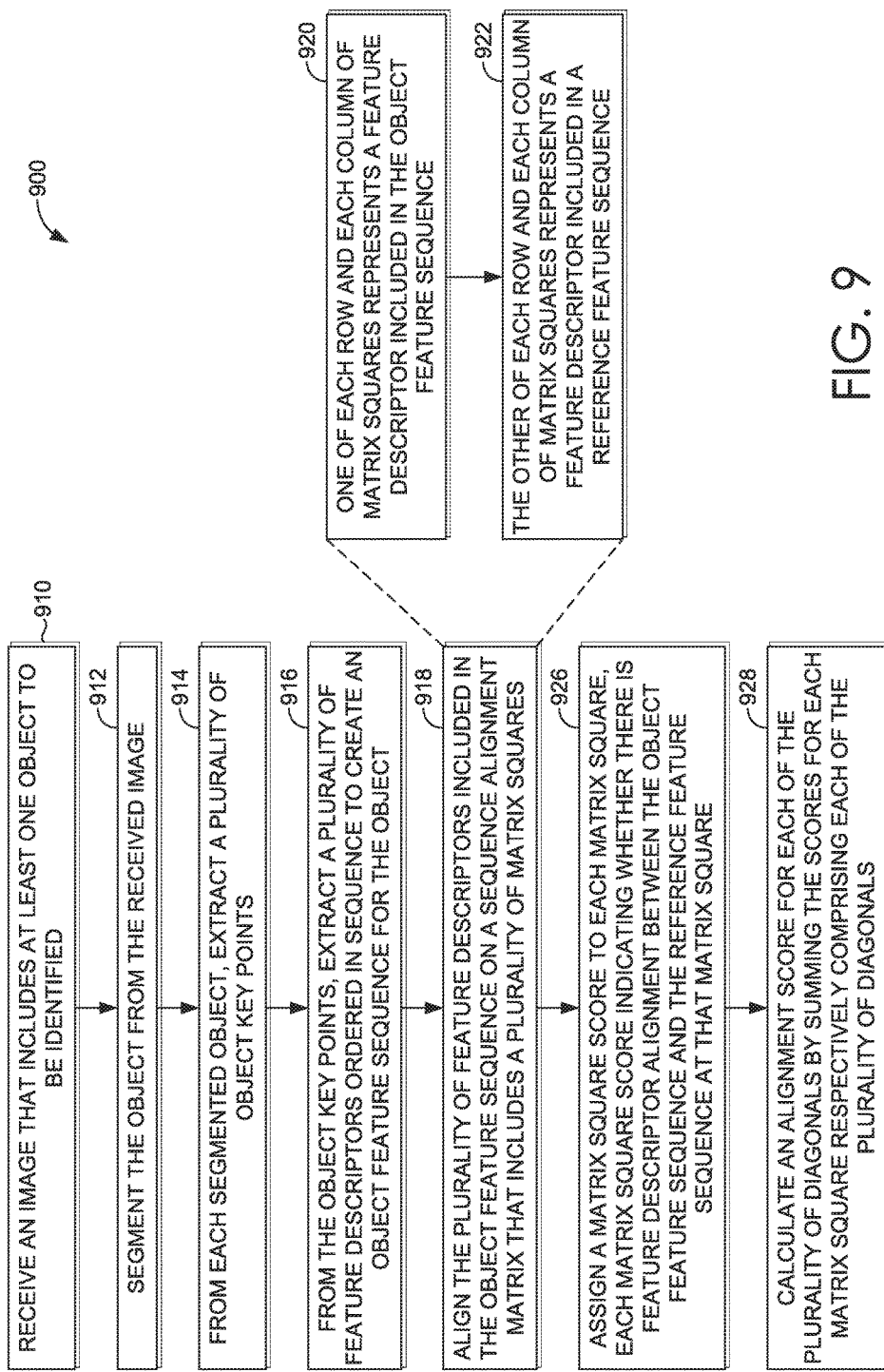
FIG. 9 is a flow diagram illustrating another exemplary method for identifying objects in images utilizing SAMs, in accordance with embodiments of the present invention.

Turning to FIG. 9, illustrated is a flow diagram showing another exemplary method 900 for identifying objects in images (for instance, in connection with computer vision systems) utilizing sequence alignment matrices, in accordance with exemplary embodiments of the present invention. As indicated at block 910, an image is received (e.g., a two-dimensional or three-dimensional image). The received image includes at least one object for which identification is desired. As indicated at block 912, the at least one object for which identification is desired is segmented from the received image. As indicated at block 914, from each segmented object, a plurality of object key points is extracted. As indicated at block 916, from the plurality of extracted object key points, a plurality of feature descriptors is extracted, the plurality of feature descriptors being ordered in sequence to create an object feature sequence for the at least one object.

The plurality of feature descriptors included in the object feature sequence is aligned on a sequence alignment matrix, as indicated at block 918. The sequence alignment matrix is comprised of a plurality of matrix squares. As indicated at block 920, each row or each column of matrix squares represents a feature descriptor of the plurality of feature descriptors included in the object feature sequence. As indicated at block 922, the other of each row or each column of matrix squares represents a feature descriptor of a plurality of feature descriptors included in a reference feature sequence.

As indicated at block 926, a matrix square score is assigned to each matrix square that includes a feature descriptor of the object feature sequence. Each matrix square score indicates whether or not there is feature descriptor alignment between the object feature sequence and the reference feature sequence at that matrix square. As indicated at block 928, an alignment score is calculated for each of the plurality of diagonals by summing the scores for each matrix square respectively comprising each of the plurality of diagonals.

Figure 10:
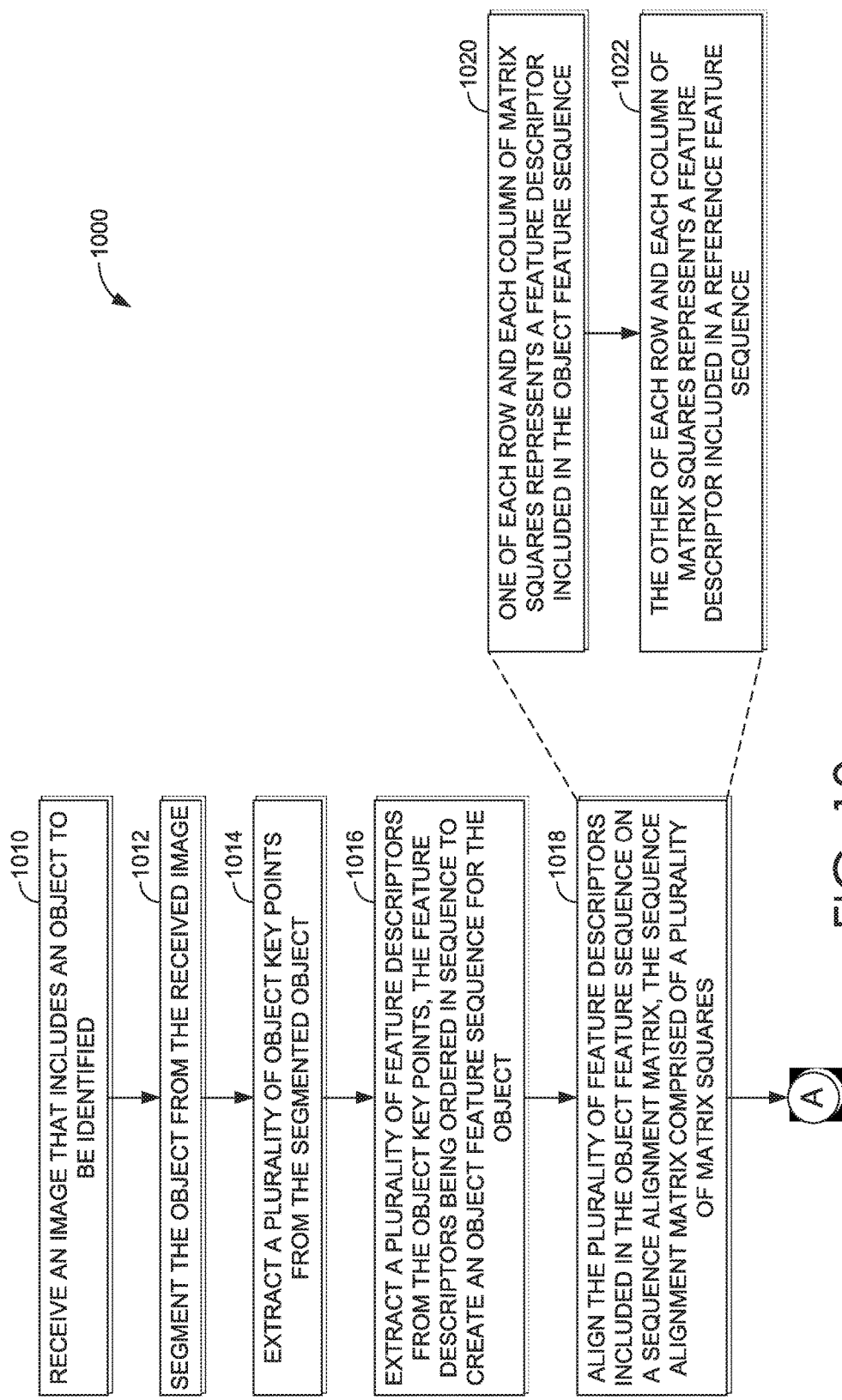
FIG. 10 is a flow diagram illustrating yet another exemplary method for identifying objects in images, in accordance with embodiments of the present invention.
Figure 10:
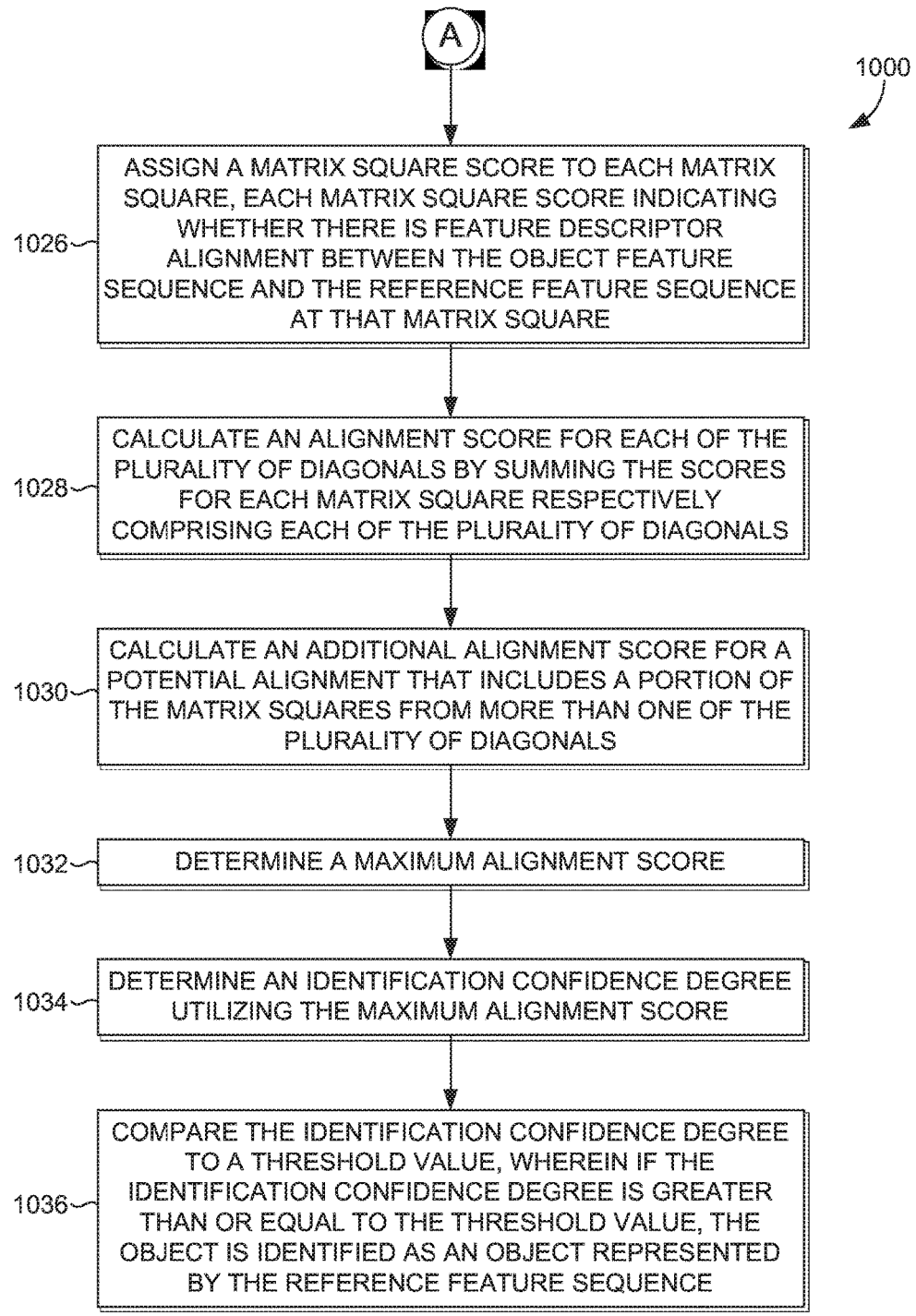

With reference to FIG. 10, a flow diagram is illustrated showing yet another exemplary method 1000 for identifying objects in images (for instance, in connection with computer vision systems) utilizing sequence alignment matrices, in accordance with exemplary embodiments of the present invention. As indicated at block 1010, an image is received (e.g., a two-dimensional or three-dimensional image). The received image includes at least one object for which identification is desired. As indicated at block 1012, the at least one object for which identification is desired is segmented from the received image. As indicated at block 1014, from each segmented object, a plurality of object key points is extracted. As indicated at block 1016, from the plurality of extracted object key points, a plurality of feature descriptors is extracted, the plurality of feature descriptors being ordered in sequence to create an object feature sequence for the at least one object.

The plurality of feature descriptors included in the object feature sequence is aligned on a sequence alignment matrix, as indicated at block 1018. The sequence alignment matrix is comprised of a plurality of matrix squares. As indicated at block 1020, each row or each column of matrix squares represents a feature descriptor of the plurality of feature descriptors included in the object feature sequence. As indicated at block 1022, the other of each row or each column of matrix squares represents a feature descriptor of a plurality of feature descriptors included in a reference feature sequence.

As indicated at block 1026, a matrix square score is assigned to each matrix square that includes a feature descriptor of the object feature sequence. Each matrix square score indicates whether or not there is feature descriptor alignment between the object feature sequence and the reference feature sequence at that matrix square. As indicated at block 1028, an alignment score is calculated for each of the plurality of diagonals by summing the scores for each matrix square respectively comprising each of the plurality of diagonals. As indicated at block 1030, a maximum alignment score for the plurality of diagonals is determined, the maximum alignment score being comprised of the diagonal having the highest sum of matrix square scores. As indicated at block 1032, an identification confidence degree is determined utilizing the maximum alignment score. As indicated at block 1034, the identification confidence degree is compared to a threshold value. If the identification confidence degree is greater than or equal to the threshold value, the object is identified as an object represented by the reference feature sequence.

Exemplary Operating Environment

Figure 11:
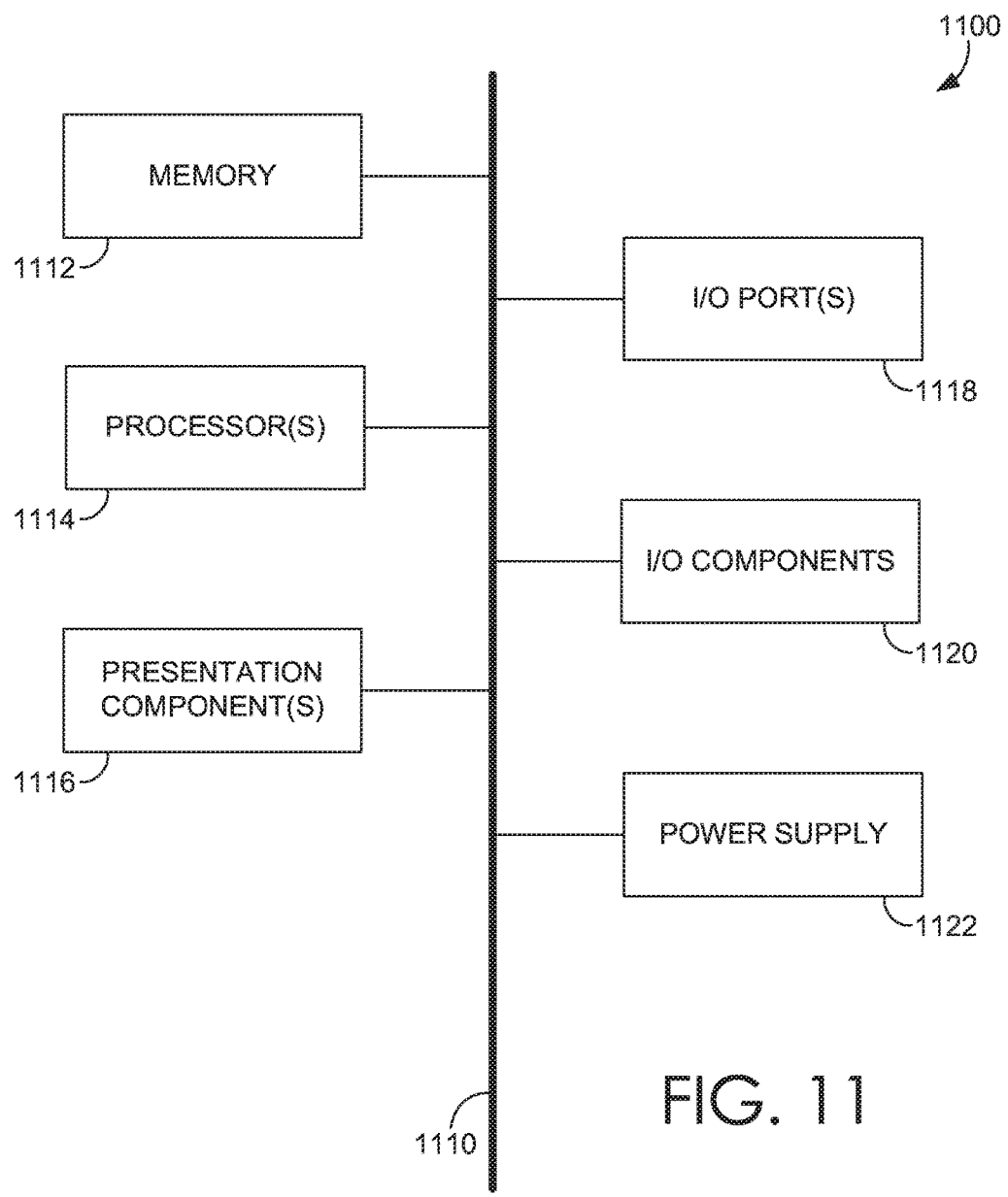
FIG. 11 is a block diagram of an exemplary computing environment suitable for use in implementing embodiments of the present invention.

Having briefly described an overview of embodiments of the present invention, an exemplary operating environment in which embodiments of the present invention may be implemented is described below in order to provide a general context for various aspects of the present invention. Referring to FIG. 11, an exemplary operating environment for implementing embodiments of the present invention is shown and designated generally as computing device 1100. The computing device 1100 is but one example of a suitable computing environment and is not intended to suggest any limitation as to the scope of use or functionality of embodiments of the invention. Neither should the computing device 1100 be interpreted as having any dependency or requirement relating to any one component nor any combination of components illustrated.

Embodiments of the invention may be described in the general context of computer code or machine-useable instructions, including computer-useable or compute executable instructions such as program modules, being executed by a computer or other machine, such as a personal data assistant or other handheld device. Generally, program modules include routines, programs, objects, components, data structures, and the like, and/or refer to code that performs particular tasks or implements particular abstract data types. Embodiments of the invention may be practiced in a variety of system configurations, including, but not limited to, hand-held devices, unattended scanning systems (e.g., laser-based or image-based) consumer electronics, general-purpose computers, more specialty computing devices, and the like. Embodiments of the invention also may be practiced in distributed computing environments where tasks are performed by remote-processing devices that are linked through a communications network.

With continued reference to FIG. 11, the computing device 1100 includes a bus 1110 that directly or indirectly couples the following devices: a memory 1112, one or more processors 1114, one or more presentation components 1116, one or more input/output (I/O) ports 1118, one or more I/O components 1120, and an illustrative power supply 1122. The bus 1110 represents what may be one or more busses (such as an address bus, data bus, or combination thereof). Although the various blocks of FIG. 11 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 11 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 11 and reference to "computing device."

The computing device 1100 typically includes a variety of computer-readable media. Computer-readable media may be any available media that is accessible by the computing device 1100 and includes both volatile and nonvolatile media, removable and non-removable media. Computer-readable media comprises computer storage media and communication media; computer storage media excluding signals per se. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 1100. Communication media, on the other hand, embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 1112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 1100 includes one or more processors that read data from various entities such as the memory 1112 or the I/O components 1120. The presentation component(s) 1116 present data indications to a user or other device. Exemplary presentation components include a display device, speaker, printing component, vibrating component, and the like.

The I/O ports 1118 allow the computing device 1100 to be logically coupled to other devices including the I/O components 1120, some of which may be built in. Illustrative I/O components include a microphone, joystick, game pad, satellite dish, scanner, printer, wireless device, a controller, such as a stylus, a keyboard and a mouse, a natural user interface (NUI), and the like.

A NUI processes air gestures, voice, or other physiological inputs generated by a user. These inputs may be interpreted, for instance, as words or symbols appearing in programs and/or apps, and the like presented by the computing device 1100. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 1100. The computing device 1100 may be equipped with depth cameras, such as, stereoscopic camera systems, infrared camera systems, RGB camera systems, and combinations of these for gesture detection and recognition. Additionally, the computing device 1100 may be equipped with accelerometers or gyroscopes that enable detection of motion. The output of the accelerometers or gyroscopes may be provided to the display of the computing device 1100 to render immersive augmented reality or virtual reality.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices. The computer-useable instructions form an interface to allow a computer to react according to a source of input. The instructions cooperate with other code segments to initiate a variety of tasks in response to data received in conjunction with the source of the received data.

Exemplary Features Having Multiple Dependencies:

As used herein and in connection with the features listed hereinafter, the terminology "any of features" or similar variations of said terminology is intended to be interpreted such that features may be combined in any combination. For example, an exemplary feature 4 may indicate the method/computer-readable storage medium of any of features 1 through 3, which is intended to be interpreted such that elements of feature 1 and feature 4 may be combined, elements of feature 2 and feature 4 may be combined, elements of feature 3 and feature 4 may be combined, elements of features 1, 2, and 4 may be combined, elements of features 2, 3, and 4 may be combined, elements of features 1, 2, 3, and 4 may be combined, and/or other variations. Further, the terminology "any of features" or similar variations of said terminology is intended to include "any one of features" or other variations of such terminology, as indicated by some of the examples provided above.

Feature 1: A method being performed by one or more computing devices including at least one processor, the method for identifying objects in images utilizing sequence alignment matrices and comprising: (a) receiving an image, the image including at least one object to be identified; (b) preparing the image for alignment by creating an object feature sequence for the at least one object to be identified, the object feature sequence including of a plurality of feature descriptors; (c) aligning the plurality of feature descriptors included in the object feature sequence on a sequence alignment matrix, the sequence alignment matrix comprised of a plurality of matrix squares, such that: one of each row and each column of matrix squares represents a feature descriptor of the plurality of feature descriptors included in the object feature sequence, and the other of each row and each column of matrix squares represents a feature descriptor of a plurality of feature descriptors included in a reference feature sequence; (d) assigning a matrix square score to each matrix square, each matrix square score indicating whether or not there is feature descriptor alignment between object feature sequence and the reference feature sequence at that matrix square; and (e) calculating an alignment score for each of the plurality of diagonals by summing the scores for each matrix square respectively comprising each of the plurality of diagonals.

Feature 2. The method of feature 1, further comprising calculating an additional alignment score for a potential alignment that includes a portion of the matrix squares from more than one of the plurality of diagonals.

Feature 3. The method of any of features 1 or 2, wherein preparing the image for alignment comprises: segmenting the at least one object to be identified from the received image; from each segmented object, extracting a plurality of object key points; and from each set of object key points, extracting the plurality of feature descriptors ordered in sequence to create the object feature sequence for the at least one object.

Feature 4. The method of any of features 1, 2 or 3, further comprising: determining a maximum alignment score; based upon the maximum alignment score, determining an identification confidence degree; and comparing the identification confidence degree to a threshold value.

Feature 5. The method of feature 4, wherein if the identification confidence degree is greater than or equal to the threshold value, the method further comprises identifying the at least one object as an object represented by the reference feature sequence.

Feature 6. The method of any of features 1-5, wherein receiving an image comprises receiving one of a two-dimensional image, a three-dimensional image, and a frame of a video sequence.

Feature 7. The method of any of features 1-6, wherein the received image is one or more of translated, rotated, scaled in size, and partially obstructed from view with respect to a reference object represented by the reference feature sequence.

Feature 8. The method of any of features 1-7, wherein the reference feature sequence is obtained from one of a reference feature sequence database and another frame of a data stream from which the image is received.

Feature 9. The method of any of features 1-8, wherein assigning a matrix square score to each matrix square comprises, for each of the plurality of diagonals, assigning a progressive positive integer to each sequential matrix square having a matching feature descriptor between the plurality of feature descriptors of the object feature sequence and the plurality of feature descriptors of the reference feature sequence.

Feature 10. The method of feature 9, wherein assigning a progressive positive integer to each sequential matrix square having a matching feature descriptor between the plurality of feature descriptors of the object feature sequence and the plurality of feature descriptors of the reference feature sequence comprises assigning a progressive positive integer beginning with number one (1) to each sequential matrix square having a matching feature descriptor between the plurality of feature descriptors of the object feature sequence and the plurality of feature descriptors of the reference feature sequence.

Feature 11. The method of any of features 9 or 10, wherein assigning a matrix square score to each matrix square comprises, for each of the plurality of diagonals, assigning a value of zero (0) to each matrix square that does not have a matching feature descriptor between the plurality of feature descriptors of the object feature sequence and the plurality of feature descriptors of the reference feature sequence.

Feature 12. The method of feature 11, wherein assigning a matrix square score to each matrix square comprises, for each of the plurality of diagonals, assigning a value of one (1) to each matrix square that follows a matrix square having an assigned value of zero (0).

Feature 13. One or more computer-readable storage media storing computer-useable instructions that, when used by one or more computing devices, cause the one or more computing devices to perform a method for identifying objects in images utilizing sequence alignment matrices, the method comprising: (a) receiving an image, the image including at least one object to be identified; (b) segmenting the at least one object to be identified from the received image; (c) from each segmented object, extracting a plurality of object key points; (d) from the plurality of object key points, extracting a plurality of feature descriptors ordered in sequence to create an object feature sequence for the at least one object to be identified; (e) aligning the plurality of feature descriptors included in the object feature sequence on a sequence alignment matrix, the sequence alignment matrix comprised of a plurality of matrix squares, such that: one of each row and each column of matrix squares represents one of the plurality of feature descriptors included in the object feature sequence, and the other of each row and each column of matrix squares represents one of a plurality of feature descriptors included in a reference feature sequence; (f) assigning a matrix square score to each matrix square, each matrix square score indicating whether or not there is feature descriptor alignment between the object feature sequence and the reference feature sequence at that matrix square; and (g) calculating an alignment score for each of the plurality of diagonals by summing the scores for each matrix square respectively comprising each of the plurality of diagonals.

Feature 14. The one or more computer-readable storage media of feature 13, wherein the method further comprises calculating an additional alignment score for a potential alignment that includes a portion of the matrix squares from more than one of the plurality of diagonals.

Feature 15. The one or more computer-readable storage media of feature 14, wherein the method further comprises: (h) determining a maximum alignment score; (i) based upon the maximum alignment score, determining an identification confidence degree; and (j) comparing the identification confidence degree to a threshold value, wherein if the identification confidence degree is greater than or equal to the threshold value, the method further comprises: (k) identifying the at least one object as a reference object represented by the reference feature sequence.

Feature 16. The one or more computer-readable storage media of any of features 13-15, wherein assigning a matrix square score to each matrix square comprises, for each of the plurality of diagonals, assigning a progressive positive integer to each sequential matrix square having a matching feature descriptor between the plurality of feature descriptors of the object feature sequence and the plurality of feature descriptors of the reference feature sequence.

Feature 17. The one or more computer-readable storage media of any of features 13-16, wherein assigning a progressive positive integer to each sequential matrix square having a matching feature descriptor between the plurality of feature descriptors of the object feature sequence and the plurality of feature descriptors of the reference feature sequence comprises assigning a progressive positive integer beginning with number one (1) to each sequential matrix square having a matching feature descriptor between the plurality of feature descriptors of the object feature sequence and the plurality of feature descriptors of the reference feature sequence.

Feature 18. The one or more computer-readable storage media of any of features 13-17, wherein assigning a matrix square score to each matrix square comprises, for each of the plurality of diagonals, assigning a value of zero (0) to each matrix square that does not have a matching feature descriptor between the plurality of feature descriptors of the object feature sequence and the plurality of feature descriptors of the reference feature sequence.

Feature 19. The one or more computer-readable storage media of feature 18, wherein assigning a matrix square score to each matrix square comprises, for each of the plurality of diagonals, assigning a value of one (1) to each matrix square that follows a matrix square having an assigned value of zero (0).

Feature 20. A method for identifying objects in images utilizing sequence alignment matrices, the method comprising: (a) receiving an image that includes an object to be identified; (b) segmenting the object to be identified from the received image; (c) extracting a plurality of object key points from the segmented object; (d) extracting a plurality of feature descriptors from the plurality of object key points, the plurality of feature descriptors being ordered in sequence to create an object feature sequence for the object; (e) aligning the plurality of feature descriptors included in the object feature sequence on a sequence alignment matrix, the sequence alignment matrix comprised of a plurality of matrix squares, such that: one of each row and each column of matrix squares represents one of the plurality of feature descriptors included in the object feature sequence, and the other of each row and each column of matrix squares represents one of a plurality of feature descriptors included in a reference feature sequence; (f) assigning a matrix square score to each matrix square that includes a feature descriptor of the object feature sequence, each matrix square score indicating whether or not there is feature descriptor alignment between the plurality of feature descriptors included in the object feature sequence and the plurality of feature descriptors included in the reference feature sequence at that matrix square; (g) calculating an alignment score for each of the plurality of diagonals by summing the scores for each matrix square respectively comprising each of the plurality of diagonals; (h) calculating an additional alignment score for a potential alignment that includes a portion of the matrix squares from more than one of the plurality of diagonals; (i) determining a maximum alignment score; (j) determining an identification confidence degree utilizing the maximum alignment score; and (k) comparing the identification confidence degree to a threshold value, wherein if the identification confidence degree is greater a or equal to the threshold value, the object is identified as an object represented by the reference feature sequence.

As can be understood, embodiments of the present invention provide systems, methods, and computer-readable storage media for, among other things, reconstructing barcode signals utilizing sequence alignment matrices. Aspects hereof have been described in relation to particular embodiments, which are intended in all respects to be illustrative rather than restrictive. Alternative embodiments will become apparent to those of ordinary skill in the art to which aspects of the present invention pertain without departing from its scope.

While aspects hereof are susceptible to various modifications and alternative constructions, certain illustrated embodiments are shown in the drawings and have been described above in detail. It should be understood, however, that there is no intention to limit aspects hereof to the specific forms disclosed, but on the contrary, the intention is to cover all modifications, alternative constructions, and equivalents falling within the spirit and scope of aspects of the invention.

What is claimed is:

1. A method being performed by one or more computing devices including at least one processor, the method for identifying objects in images utilizing sequence alignment matrices and comprising:
   (a) receiving an image, the image including at least one object to be identified;
   (b) preparing the image for alignment by creating an object feature sequence for the at least one object to be identified, the object feature sequence including of a plurality of feature descriptors;
   (c) aligning the plurality of feature descriptors included in the object feature sequence on a sequence alignment matrix, the sequence alignment matrix comprised of a plurality of matrix squares, such that:
      one of each row and each column of matrix squares represents a feature descriptor of the plurality of feature descriptors included in the object feature sequence,
      the other of each row and each column of matrix squares represents a feature descriptor of a plurality of feature descriptors included in a reference feature sequence, and
      the object feature sequence is sequentially aligned on a plurality of diagonals of the sequence alignment matrix such that each of the plurality of diagonals represents a potential alignment of the object feature sequence and the reference feature sequence;
   (d) assigning a matrix square score to each matrix square, each matrix square score indicating whether or not there is feature descriptor alignment between the object feature sequence and the reference feature sequence at that matrix square; and
   (e) calculating an alignment score for each of the plurality of diagonals by summing the scores for each matrix square respectively comprising each of the plurality of diagonals.

2. The method of claim 1, further comprising calculating an additional alignment score for a potential alignment that includes a portion of the matrix squares from more than one of the plurality of diagonals.

3. The method of claim 2, wherein preparing the image for alignment comprises:
   segmenting the at least one object to be identified from the received image;
   from each segmented object, extracting a plurality of object key points; and
   from each set of object key points, extracting the plurality of feature descriptors ordered in sequence to create the object feature sequence for the at least one object.

4. The method of claim 2, further comprising:
   determining a maximum alignment score;
   based upon the maximum alignment score, determining an identification confidence degree; and
   comparing the identification confidence degree to a threshold value.

5. The method of claim 4, wherein if the identification confidence degree is greater than or equal to the threshold value, the method further comprises identifying the at least one object as an object represented by the reference feature sequence.

6. The method of claim 1, wherein receiving an image comprises receiving one of a two-dimensional image, a three-dimensional image, and a frame of a video sequence.

7. The method of claim 1, wherein the received image is one or more of translated, rotated, scaled in size, and partially obstructed from view with respect to a reference object represented by the reference feature sequence.

8. The method of claim 1, wherein the reference feature sequence is obtained from one of a reference feature sequence database and another frame of a data stream from which the image is received.

9. The method of claim 1, wherein assigning a matrix square score to each matrix square comprises, for each of the plurality of diagonals, assigning a progressive positive integer to each sequential matrix square having a matching feature descriptor between the plurality of feature descriptors of the object feature sequence and the plurality of feature descriptors of the reference feature sequence.

10. The method of claim 9, wherein assigning a progressive positive integer to each sequential matrix square having a matching feature descriptor between the plurality of feature descriptors of the object feature sequence and the plurality of feature descriptors of the reference feature sequence comprises, for each of the plurality of diagonals, assigning a progressive positive integer beginning with number one (1) to each sequential matrix square having a matching feature descriptor between the plurality of feature descriptors of the object feature sequence and the plurality of feature descriptors of the reference feature sequence.

11. The method of claim 9, wherein assigning a matrix square score to each matrix square comprises, for each of the plurality of diagonals, assigning a value of zero (0) to each matrix square that does not have a matching feature descriptor between the plurality of feature descriptors of the object feature sequence and the plurality of feature descriptors of the reference feature sequence.

12. The method of claim 11, wherein assigning a matrix square score to each matrix square comprises, for each of the plurality of diagonals, assigning a value of one (1) to each matrix square that follows a matrix square having an assigned value of zero (0).

13. One or more computer-readable storage media storing computer-useable instructions that, when used by one or more computing devices, cause the one or more computing devices to perform a method for identifying objects in images utilizing sequence alignment matrices, the method comprising:
   (a) receiving an image, the image including at least one object to be identified;
   (b) segmenting the at least one object to be identified from the received image;
   (c) from each segmented object, extracting a plurality of object key points;
   (d) from the plurality of object key points, extracting a plurality of feature descriptors ordered in sequence to create an object feature sequence for the at least one object to be identified;
   (e) aligning the plurality of feature descriptors included in the object feature sequence on a sequence alignment matrix, the sequence alignment matrix comprised of a plurality of matrix squares, such that:
      one of each row and each column of matrix squares represents one of the plurality of feature descriptors included in the object feature sequence, the other of each row and each column of matrix squares represents one of a plurality of feature descriptors included in a reference feature sequence, and the object feature sequence is sequentially aligned on a plurality of diagonals of the sequence alignment matrix such that each of the plurality of diagonals represents a potential alignment of the object feature sequence and the reference feature sequence;

(f) assigning a matrix square score to each matrix square, each matrix square score indicating whether or not there is feature descriptor alignment between the object feature sequence and the reference feature sequence at that matrix square; and (g) calculating an alignment score for each of the plurality of diagonals by summing the scores for each matrix square respectively comprising each of the plurality of diagonals.

14. The one or more computer-readable storage media of claim 13, wherein the method further comprises calculating an additional alignment score for a potential alignment that includes a portion of the matrix squares from more than one of the plurality of diagonals.

15. The one or more computer-readable storage media of claim 14, wherein the method further comprises:
(h) determining a maximum alignment score;
(i) based upon the maximum alignment score, determining an identification confidence degree; and
(j) comparing the identification confidence degree to a threshold value, wherein if the identification confidence degree is greater than or equal to the threshold value, the method further comprises:
(k) identifying the at least one object as a reference object represented by the reference feature sequence.

16. The one or more computer-readable storage media of claim 13, wherein assigning a matrix square score to each matrix square comprises, for each of the plurality of diagonals, assigning a progressive positive integer to each sequential matrix square having a matching feature descriptor between the plurality of feature descriptors of the object feature sequence an the plurality of feature descriptors of the reference feature sequence.

17. The one or more computer-readable storage media of claim 16, wherein assigning a progressive positive integer to each sequential matrix square having a matching feature descriptor between the plurality of feature descriptors of the object feature sequence and the plurality of feature descriptors of the reference feature sequence comprises assigning a progressive positive integer beginning with number one (1) to each sequential matrix square having a matching feature descriptor between the plurality of feature descriptors of the object feature sequence and the plurality of feature descriptors of the reference feature sequence.

18. The one or more computer-readable storage media of claim 13, wherein assigning a matrix square score to each matrix square comprises, for each of the plurality of diagonals, assigning a value of zero (0) to each matrix square that does not have a matching feature descriptor between the plurality of feature descriptors of the object feature sequence and the plurality of feature descriptors of the reference feature sequence.

19. The one or more computer-readable storage media of claim 18, wherein assigning a matrix square score to each matrix square comprises, for each of the plurality of diagonals, assigning a value of one (1) to each matrix square that follows a matrix square having an assigned value of zero (0).

20. A method for identifying objects in images utilizing sequence alignment matrices, the method comprising:
(a) receiving an image that includes an object to be identified;
(b) segmenting the object to be identified from the received image;
(c) extracting a plurality of object key points from the segmented object;
(d) extracting a plurality of feature descriptors from the plurality of object key points, the plurality of feature descriptors being ordered in sequence to create an object feature sequence for the object;
(e) aligning the plurality of feature descriptors included in the object feature sequence on a sequence alignment matrix, the sequence alignment matrix comprised of a plurality of matrix squares, such that:
one of each row and each column of matrix squares represents one of the plurality of feature descriptors included in the object feature sequence,
the other of each row and each column of matrix squares represents one of a plurality of feature descriptors included in a reference feature sequence, and
the object feature sequence is sequentially aligned on a plurality of diagonals of the sequence alignment matrix such that each of the plurality of diagonals represents a potential alignment of the object feature sequence and the reference feature sequence;
(f) assigning a matrix square score to each matrix square, each matrix square score indicating whether or not there is feature descriptor alignment between the plurality of feature descriptors included in the object feature sequence and the plurality of feature descriptors included in the reference feature sequence at that matrix square;
(g) calculating an alignment score for each of the plurality of diagonals by summing the scores for each matrix square respectively comprising each of the plurality of diagonals;
(h) calculating at least one additional alignment score for a potential alignment that includes a portion of the matrix squares from more than one of the plurality of diagonals;
(i) determining a maximum alignment score for the plurality of diagonals;
(j) determining an identification confidence degree utilizing the maximum alignment score; and
(k) comparing the identification confidence degree to a threshold value, wherein if the identification confidence degree is greater than or equal to the threshold value, the object is identified as an object represented by the reference feature sequence.

* * * * *